(12) United States Patent
Rong

(10) Patent No.: US 12,075,362 B2
(45) Date of Patent: Aug. 27, 2024

(54) SYSTEM AND METHOD FOR UPLINK POWER CONTROL IN MULTI-AP COORDINATION

(71) Applicant: Huawei Technologies Co., Ltd., Shenzhen (CN)

(72) Inventor: Zhigang Rong, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 17/600,183

(22) PCT Filed: Apr. 1, 2020

(86) PCT No.: PCT/CN2020/082783
§ 371 (c)(1),
(2) Date: Sep. 30, 2021

(87) PCT Pub. No.: WO2020/200245
PCT Pub. Date: Oct. 8, 2020

(65) Prior Publication Data
US 2022/0201620 A1    Jun. 23, 2022

Related U.S. Application Data

(60) Provisional application No. 62/827,962, filed on Apr. 2, 2019.

(51) Int. Cl.
*H04W 52/14*    (2009.01)
*H04W 52/24*    (2009.01)

(52) U.S. Cl.
CPC ....... *H04W 52/146* (2013.01); *H04W 52/242* (2013.01); *H04W 52/243* (2013.01)

(58) Field of Classification Search
CPC ............. H04W 52/146; H04W 52/242; H04W 52/243; H04W 72/542; H04W 72/1268; H04W 84/12
See application file for complete search history.

(56) References Cited

U.S. PATENT DOCUMENTS 7,162,250 B2 *  1/2007  Misra ................... H04W 16/08
                                                    455/445
9,967,827 B2    5/2018  Rong et al.
                        (Continued)

FOREIGN PATENT DOCUMENTS

CN    103535086 A    1/2014
CN    104427632 A    3/2015
            (Continued)

OTHER PUBLICATIONS

Pantech, "Uplink power control enhancement in new deployment scenarios", 3GPP TSG RAN1 #66bis, R1- 113111, Oct. 10-14, 2011, 4 Pages, Zhuhai, China.

*Primary Examiner* — Farid Seyedvosoghi
(74) *Attorney, Agent, or Firm* — Slater Matsil, LLP

(57) ABSTRACT

Embodiments compute a target power level referenced at one Access Point (AP) in accordance with path losses between two or more APs and a Station (STA). The calculated target power level is then transmitted to the STA in a downlink message, which may also include resource allocation information that indicates a location of a resource for transmitting an uplink frame. The STA may then use the target power level to calculate an uplink power level for transmitting the uplink frame over the resource location indicated by the downlink frame. In addition to the path loss values, the target power level may also be computed in accordance with measured interference levels at the APs and/or a target receive power level that is associated with, or otherwise required to decode, the uplink frame.

23 Claims, 5 Drawing Sheets

(56) References Cited

U.S. PATENT DOCUMENTS

| | | | | |
|---|---|---|---|---|
| 2005/0083895 A1* | 4/2005 | Pinault | ............... | H04W 88/08 |
| | | | | 455/522 |
| 2014/0247796 A1 | 9/2014 | Ouchi et al. | | |
| 2016/0100370 A1* | 4/2016 | Rong | ............... | H04W 52/367 |
| | | | | 455/522 |
| 2016/0249351 A1* | 8/2016 | Wang | ............... | H04W 72/23 |
| 2017/0070961 A1* | 3/2017 | Bharadwaj | ............ | H04L 1/0009 |

FOREIGN PATENT DOCUMENTS

| | | | | |
|---|---|---|---|---|
| CN | 103535086 B | * | 5/2017 | ......... H04W 52/242 |
| CN | 107113749 A | | 8/2017 | |
| CN | 108055880 A | | 5/2018 | |
| CN | 108632971 A | | 10/2018 | |
| CN | 109413672 A | | 3/2019 | |
| EP | 2400801 A1 | | 12/2011 | |
| EP | 3041307 A1 | | 7/2016 | |
| WO | WO-03001742 A1 | * | 1/2003 | ............ H04W 16/14 |
| WO | 2016050213 A1 | | 4/2016 | |
| WO | 2017030698 A1 | | 2/2017 | |
| WO | 2017040788 A1 | | 3/2017 | |

\* cited by examiner

SYSTEM AND METHOD FOR UPLINK POWER CONTROL IN MULTI-AP COORDINATION

CROSS-REFERENCE TO RELATED APPLICATIONS

This application is a National Stage of International Application No. PCT/CN2020/082783, filed on Apr. 1, 2020, titled "System and Method for Uplink Power Control in Multi-AP Coordination", which claims priority to U.S. Provisional Patent Application No. 62/827,962, filed on Apr. 2, 2019. Both of the aforementioned applications are hereby incorporated by reference in their entireties.

TECHNICAL FIELD

The present disclosure relates generally to a system and method for wireless communications, and, in particular embodiments, to a system and method for uplink power control in a communications system with multi-access point coordination.

BACKGROUND

Current generation wireless communications systems provide high data rates for mobile communications devices to enable a rich multi-media environment for users of the mobile communications devices. As the complexity of applications available to the users continues to increase so does the need for increased throughput and lower latency for data transmission on the communication devices. As an example, newly emerging technologies and applications such as high-definition video (e.g., 4 k, 8 k, etc.) over wireless local area network (WLAN), augmented reality (AR), virtual reality (VR), and so on, place significantly higher performance requirements (e.g., higher throughput, lower latency, etc.) on wireless communications systems than existing technologies and applications.

The Institute of Electrical and Electronic Engineers (IEEE) 802.11 Working Group (WG) has formed a Study Group (SG) referred to as Extremely High Throughput (EHT) to develop new generations of physical (PHY) and media access control (MAC) layers with goals of increased peak throughput, improved efficiency, and low latency. The EHT SG is targeting operation in bands between 1 GHz and 7.125 GHz. One technology that can help achieve the goals of EHT is multiple AP (multi-AP) coordination. The use of multiple coordinated access points (APs) to decode the signal received from the station (STA) allows the STA to transmit at lower power.

SUMMARY

Technical advantages are generally achieved by embodiments of this disclosure which describe systems and methods for uplink power control in a multi-AP co-ordination.

In an embodiment, a method of communicating in a wireless system is provided. In this example, the method includes transmitting, by a first access point (AP), a downlink frame to a station (STA). Examples of stations include any component capable of establishing a wireless connection with an AP, such as a user equipment (UE), mobile station, a sensor, and/or other wirelessly enabled device. The downlink frame includes resource allocation information indicating a location of a resource for transmitting an uplink frame and an indication of a target power level. The target power level is computed by the first AP in accordance with a first path loss between the first AP and the STA and a second path loss between a second AP and the STA. In one example, the downlink frame further includes an indication of a transmit power of the downlink frame and an identifier of the second AP. In the same example, or in another example, the method further includes computing, by the first AP, the target power level using the first path loss between the first AP and the STA, a first interference level measured by the first AP, the second path loss between the second AP and the STA, and a second interference level measured by the second AP. In any one of the preceding examples, or in another example, the method further includes computing, by the first AP, the first path loss between the first AP and the STA using an uplink received power measurement at the first AP and a transmit power level of an uplink frame previously transmitted by the STA. In any one of the preceding examples, or in another example, the method further includes receiving, by the first AP, a message from the second AP that indicates the second path loss between the second AP and the STA and a second interference level measured by the second AP. In any one of the preceding examples, or in another example, the method further includes receiving, by the first AP, a message from the second AP that indicates the second path loss between the second AP and the STA and a target receive power level to decode the uplink frame at the second AP. In any one of the preceding examples, or in another example, the method further includes computing, by the first AP, the target power level in accordance with the first path loss between the first AP and the STA, a first interference level measured by the first AP, the second path loss between the second AP and the STA and the target receive power level to decode the uplink frame at the second AP. An apparatus for performing this method is also provided.

In another embodiment, another method of communicating in a wireless system is provided. In this example, the method includes receiving, by a station (STA), a downlink frame from a first access point (AP). The downlink frame includes resource allocation information indicating a location of a resource for transmitting an uplink frame, an indication of a target power level, and an identifier of a second AP. The method further includes determining, by the STA, an uplink transmit power level in accordance with at least the target power level, and transmitting, by the STA, the uplink frame over the resource in accordance with the uplink transmit power level. In one example, determining the uplink transmit power level in accordance with at least the target power level comprises determining, by the STA a path loss to the first AP in accordance with a received power level of the downlink frame, and determining, by the STA, the uplink transmit power level in accordance with the target power level and the path loss from the STA to the first AP. In the same example, or in another example, determining the uplink transmit power level in accordance with the path loss and the target power level comprises calculating the uplink transmit power level as a sum of the target power level and the path loss. An apparatus for performing this method is also provided.

BRIEF DESCRIPTION OF THE DRAWINGS

For a more complete understanding of the disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
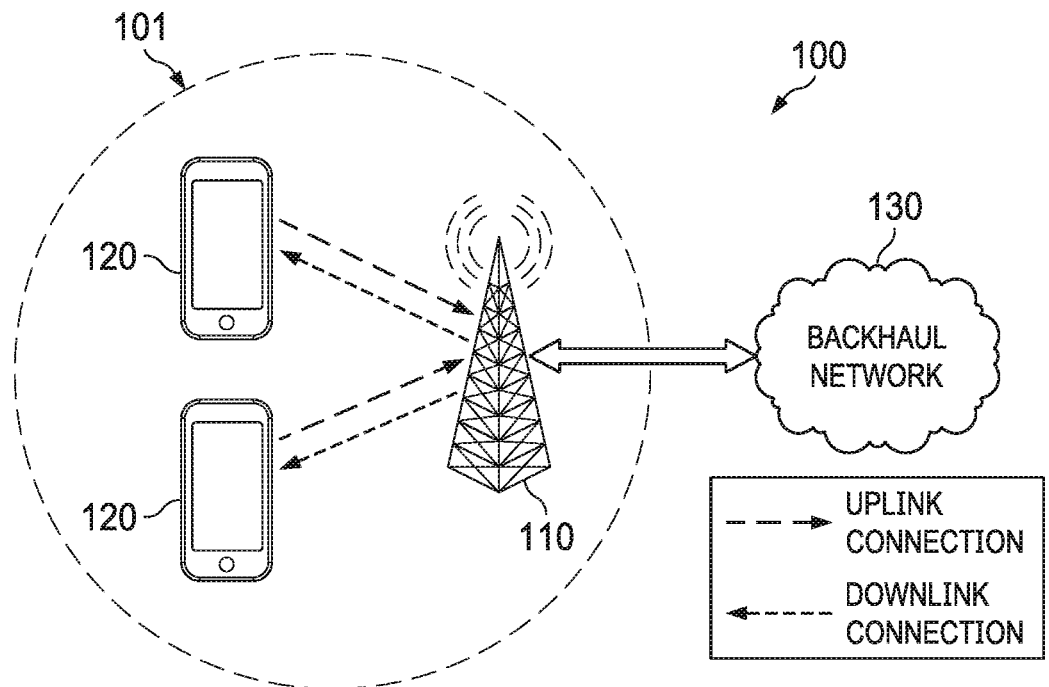
FIG. 1 is a diagram of a network 100 for communicating data.

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Using multi-AP coordination to communicate to a station (STA) can help reduce the interference in communication, and help increase throughput by increasing the number of potential spatial streams that can go through the communication channels. The interference created in the system and power transmitted by a STA are both reduced because diversity gains or signal energy combining gains in the multi-AP system lead to reduced target power for a given interference level needed to decode the signal. Examples of stations include any component capable of establishing a wireless connection with an AP, such as a user equipment (UE), mobile station, a sensor, and/or other wirelessly enabled device.

Some uplink power control techniques for enabling multi-AP coordination require every AP in the multi-AP system to send the STA a downlink frame indicating the individual AP's target receive power level (Target_APi, i=1, 2, 3 . . . ) which the STA may use to compute a target power level (also referred to as a system target power level (Target_Sys). Sending multiple messages to the STA may cause additional delay resulting in a drift between the received power and the target power level (e.g., the Target_Sys), as well as increase overhead in the downlink channel.

Aspects of this disclosure compute the target power level referenced at one of the APs in accordance with path losses between two or more respective APs and the STA. The calculated target power level is then transmitted to the STA in a downlink message, which may also include resource allocation information that indicates a location of a resource for transmitting an uplink frame. The STA may then use the target power level to calculate an uplink power level for transmitting the uplink frame over the resource location indicated by the downlink frame.

In addition to the path loss values, the target power level may also be computed in accordance with measured interference levels at the APs and/or a target receive power level that is associated with, or otherwise required to decode, the uplink frame. In some embodiments, the downlink frame includes an identifier of a neighboring AP (e.g., an AP that is different than the AP which transmitted the downlink frame) and/or an indication of a transmit power level used to transmit the downlink frame. The STA may compute the uplink transmit power as the sum of the path loss measured from the downlink frame and the target power level indicated by the downlink frame.

Embodiments of this disclosure may be used to determine the uplink transmit power level for the STA. Since the radio environment varies dynamically, the STA may adjust its uplink transmit power level to adapt to changes in the radio environment. Embodiments of this disclosure allow the STA to compute the uplink transmit power level in a single step after receiving the target power level in a downlink frame. Computing the uplink transmit power level in a single step reduces drift between the actual receive power level and the target receive power levels at the APs, when compared to techniques that compute the uplink transmit power level using multiple steps after receiving messages from multiple APs indicating the respective AP's individual target receive power level to decode the uplink frame. The reduced drift may reduce uplink transmit power levels at the STA, thereby conserving battery power of the STA, while also consuming fewer spectrum and computation resources.

FIG. 1 illustrates a network 100 for communicating data. The network 100 comprises an AP 110 having a coverage area 101, a plurality of STAs 120, and a backhaul network 130. The AP 110 may comprise any component capable of providing wireless access by, inter alia, establishing wireless connections with the STAs 120, such as a personal computer or a smart phone, and other wirelessly enabled devices. The STAs 120 may comprise any component capable of establishing a wireless connection with the AP 110, such as a user equipment (UE), mobile station, a sensor, and/or other wirelessly enabled device. The backhaul network 130 may be any component or collection of components that allow data to be exchanged between the AP no and a remote end (not shown). In some embodiments, the network 100 may comprise various other wireless devices, such as relays, femtocells, etc.

Figure 2A:
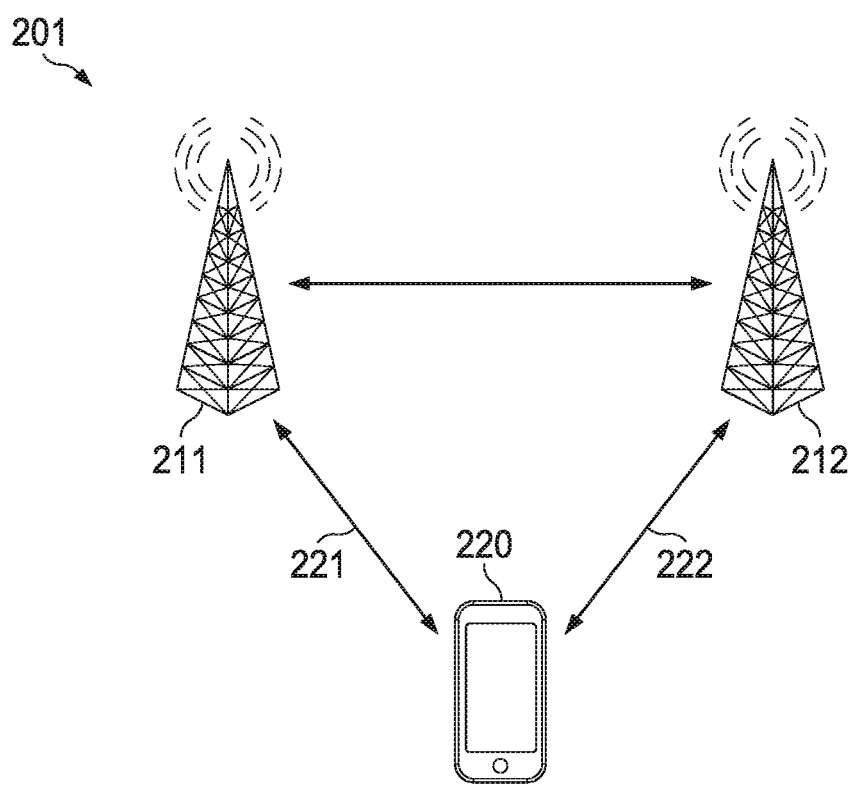
FIGS. 2A and 2B are diagrams of wireless systems configured for multi-AP coordination.
Figure 2B:
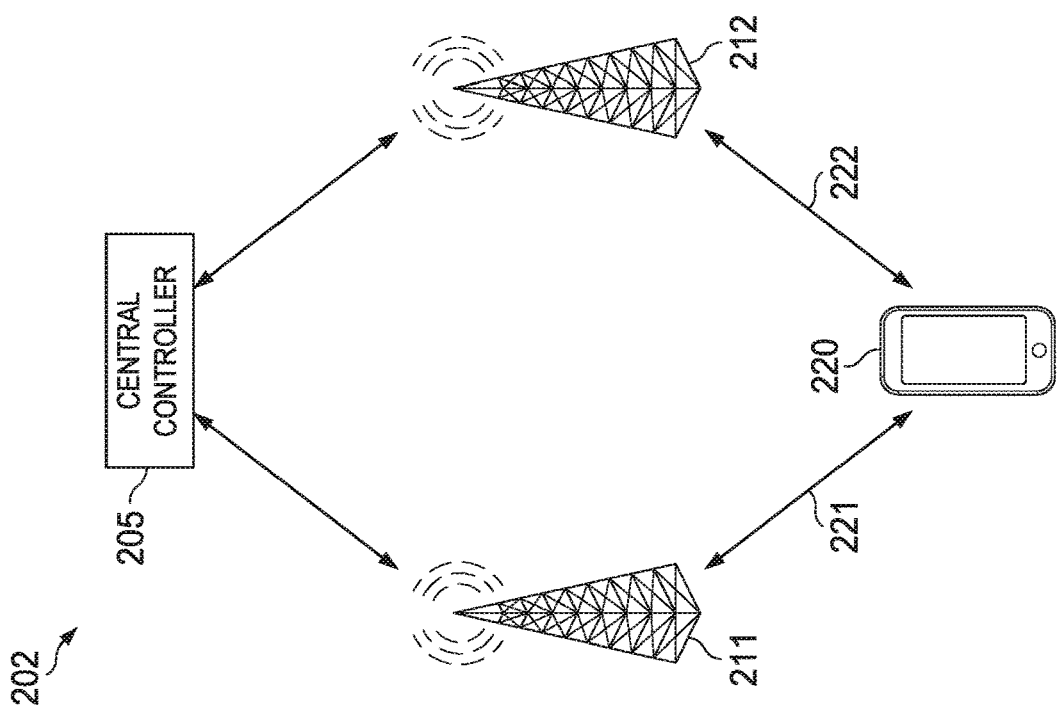

FIGS. 2A and 2B illustrate wireless systems 201, 202 (respectively) configured for multi-AP coordination. The wireless systems 201, 202 include a plurality of APs 211, 212 configured to communicate with a STA 220 over the wireless links 221, 222. The AP 211 and/or the AP 212 may transmit downlink frames to, and receive uplink frames from, the STA 220. The downlink/uplink transmissions may include various parameters, e.g., a target power level, interference levels, path loss measurements/values, target receive power levels, AP identifiers, etc. The APs 211, 212 may also exchange messages between one another, which may include various parameters, e.g., a target power level, interference levels, path loss measurements/values, target receive power levels, etc. It should be appreciated that although the wireless systems 201, 202 are depicted as including only two APs in communication with the STA 220, embodiments of this disclosure are equally applicable to implementations in which three or more APs are in communication with a STA.

In the wireless system 201, the APs 211, 212 coordinate directly with one another without utilizing a central controller. Conversely, in the wireless system 202, the APs 211, 212 coordinate indirectly via a central controller 205. The central controller 205 may be co-located with one of the APs 211, 212, or may be a stand-alone device that is separate from (e.g., located in a different physical location than) the APs 211, 212. The central controller 205 may be any component or collection of components that is configured to facilitate coordination between the APs 211, 212. The central controller 205 may be configured to perform various operations, including (but not limited to) combining uplink signals received by the APs 211, 212, selecting the best uplink signals received by the APs 211, 212, and selecting uplink data packet successfully decoded by the APs 211, 212. The central controller 205 may be coupled to the APs wirelessly, through a wireline connection, or a combination of wireless and wireline connections.

In multi-AP coordination, an uplink signal transmitted from a STA may be received by multiple APs. The uplink frame may be processed using different techniques. In one example, an uplink frame transmitted by a STA is received as received signals at different APs, and the received signals are combined together to form a signal with better signal to interference plus noise ratio (SINR) before going through the channel decoder to achieve improved diversity and energy gain. In another example, an uplink frame transmitted by a STA is received as received signals at different APs, and the received signal with the best SINR is selected to go through the channel decoder to achieve diversity gain. In yet another example, an uplink frame transmitted by a STA is received as received signals at different APs, and each of the APs performs demodulation and decoding on their respective received signal to obtain the uplink data. If any of the multiple APs successfully decode the uplink data packet, the uplink signal reception is successful. This way diversity gain can be achieved.

Figure 3:
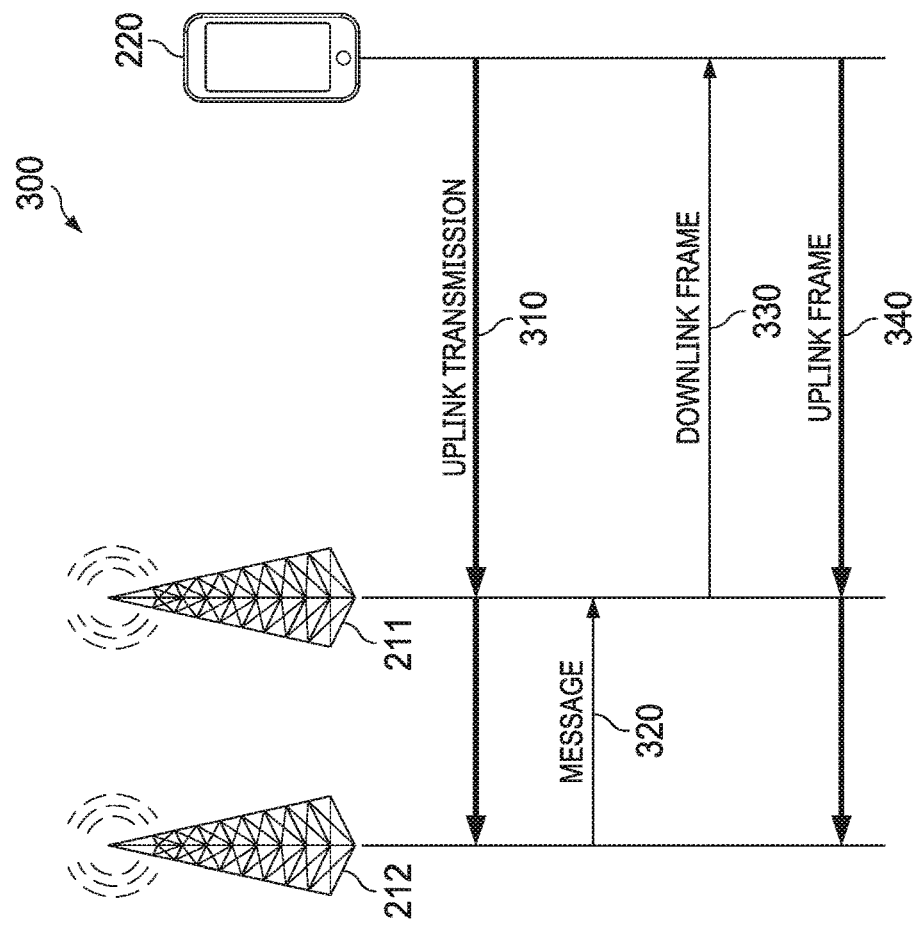
FIG. 3 is a protocol diagram of a communications sequence for uplink power control in a wireless system configured for multi-AP coordination.

Aspects of this disclosure compute a target power level at an AP in accordance with path losses between two or more respective APs and a STA, and then communicate the target power level to the STA in a downlink frame. FIG. 3 illustrates a communications sequence 300 for uplink power control in the wireless systems 201, 202 configured for multi-AP coordination. The communications sequence 300 begins when the STA 220 performs an uplink transmission 310 to the APs 211, 212, which the APs 211, 212 may use to calculate a path loss over the wireless links 221, 222 (respectively) extending between the APs 211, 212 and the STA 220. The uplink transmission 310 may include any type of signal (e.g., an uplink frame, data packet, a control packet, a sounding signal, etc.). In one embodiment, the uplink transmission 310 includes a High Efficiency Null Data Packet PHY Protocol Data Unit (HE NDP PPDU) carrying a null data field. The APs 211, 212 may compute the path loss for the wireless links 221, 222 in accordance with the received power of the uplink transmission 310. The APs 211, 212 may also use the uplink transmission 310 to determine interference levels from measurements, which may then be used to compute the individual target power levels at the respective APs. In one embodiment, the target power level for a multi-AP system (Target_Sys) is calculated from the individual target power level required to decode the uplink frame at each AP and the path losses from the station to each AP as shown by following formula: Target_Sys=min (Target_AP1+PL_STA_AP1, Target_AP2+PL_STA_AP2)−PL_STA_AP1 where Target_Sys is the target power for the two-AP system, 201 or 202, referenced at AP 211 the first AP (AP1); Target_AP1 and Target_AP2 are the individual target receive power levels required to decode the uplink frame at the first AP and at the second AP, respectively, PL_STA_AP1 is the path loss from the station to the first AP, PL_STA_AP2 is the path loss from the station to the second AP, and min( ) is a minimum function which returns the minimum value of its input elements.

The Target_Sys may be determined using the fact the station transmit power may be minimized to the level that the uplink frame is decoded by at least one of the two APs. In another embodiment, the target power levels to decode the uplink frame at the two APs are related by their interference level measurements that include noise as: Target_AP2=Target_AP1+Int_AP2−Int_AP1, where Int_AP1 and Int_AP2 are the interference levels at AP1 and AP2, respectively.

Next, the AP 212 sends a message 320 to the AP 211 that includes an indication of a path loss for the link 222. The message 320 may also include an indication of an interference measurement taken by the AP 212. Upon receiving the message 320, the AP 211 may calculate the target power level for the system Target_Sys to send in a downlink frame 330 that includes resource allocation for the uplink frame and an identifier for AP 212. The station is then able to use the information from 330 to transmit an uplink frame 340.

Figures 4, 5:
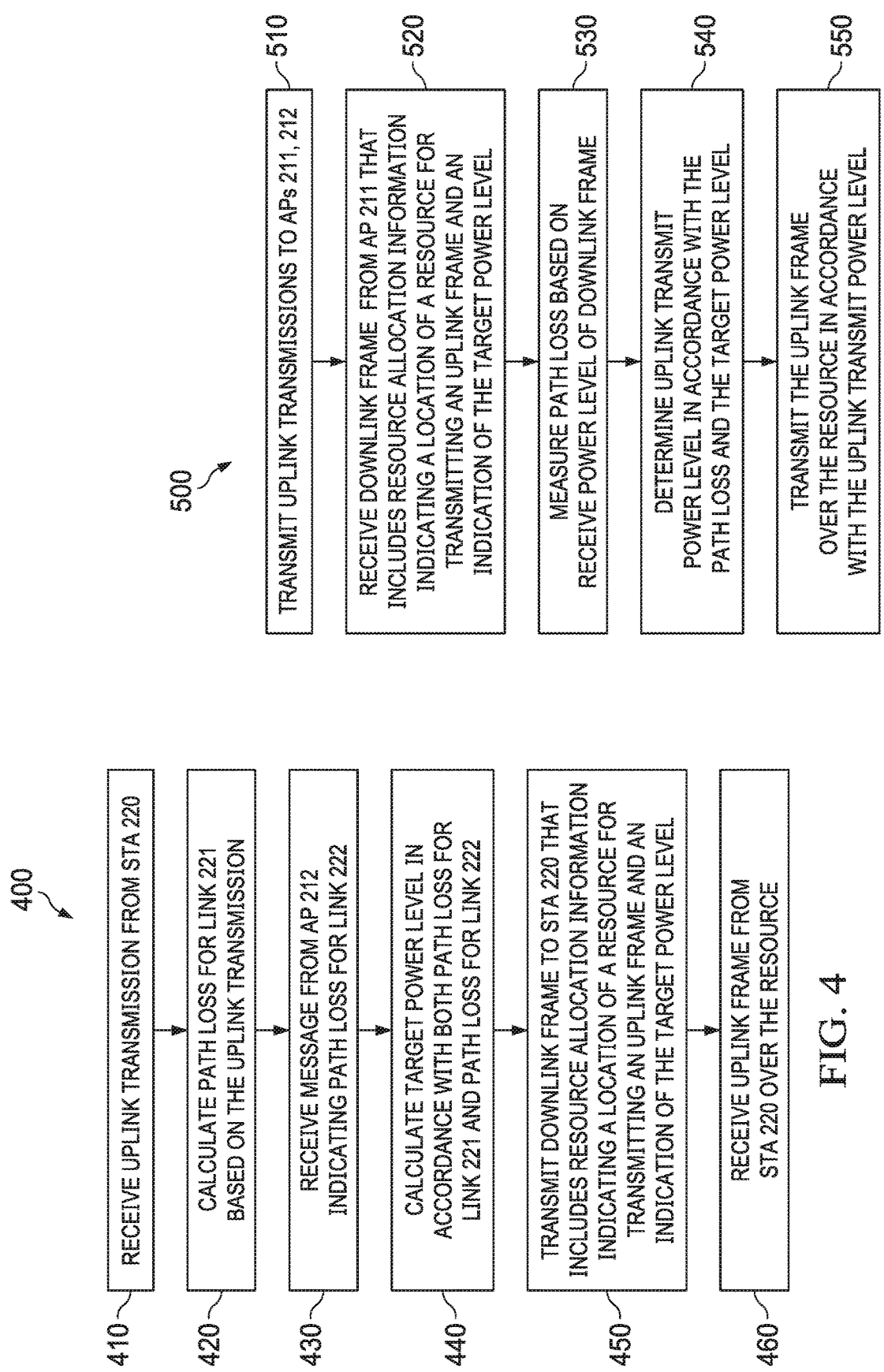
FIG. 4 is a flowchart of a method for communicating in a wireless system.
FIG. 5 is a flowchart of a method for communicating in a wireless system.

FIG. 4 is a flowchart of a method 400 for communicating in a wireless system, as may be performed by the AP 211. At step 410, the AP 211 receives an uplink transmission from the STA 220. At step 420, the AP 211 calculates a path loss for link 221 in accordance with the uplink transmission received in step 410. For example, the path loss may be computed using a received power level of the uplink transmission received in step 410 and a transmission power level of the uplink transmission received in step 410. The transmission power level of the uplink transmission may be specified by the uplink transmission. At step 430, the AP 211 receives a message from the AP 212 that indicates a path loss for the link 222. The message may also include information about an interference level measured at the AP 212 and/or a target receive power level to decode the uplink frame at the AP 212. At step 440, the AP 211 calculates a target power level in accordance with both the path loss for link 221 and path loss for link 222. The target receive power level may also be computed in accordance with an interference level and/or individual target receive power level for both APs 211, 212. At step 450, the AP 211 transmits a downlink frame to the STA 220 that includes resource allocation information indicating a location of a resource for transmitting an uplink frame and an indication of the target power level. The downlink frame may also include a basic service set identifier (BSSID) of AP 212. At step 460, the AP 211 receives an uplink frame from the STA 220 over the resource indicated by the downlink frame transmitted in step 450.

FIG. 5 is a flowchart of a method 500 for communicating in a wireless system, as may be performed by the STA 220. At step 510, STA 220 sends an uplink transmission to AP 211 and AP 212. The uplink frame transmitted may include an indication of the transmit power level to allow the APs to compute their path loss to the station. At step 520, STA 220 receives a downlink frame from AP 211 that includes resource allocation information indicating a location of a resource for transmitting an uplink frame and an indication of the target power level. The downlink frame may also include an indication of its transmit power level and an identifier of a neighboring AP. Next, at step 530, STA 220 measures path loss in accordance with receive power level of downlink frame. The path loss, from AP 211 to STA 220, measured is the difference between the transmit power level of the downlink frame transmitted from AP 211 and the received power level of the frame at STA 220. Then, at step 540, STA 220 determines an uplink transmit power level in accordance with the path loss and the target power level. STA 220 adds the target power level specified at AP 211 and the path loss from STA 220 to AP 211 to obtain the transmit power level of the uplink frame it shall be sending. STA 220 may further limit the transmit power level considering its maximum transmit power. Finally, at step 550 transmits an uplink frame over the resource in accordance with the uplink transmit power level.

Although the multi-AP systems presented herein show two APs, the example embodiments presented herein also apply to more than two APs. In such cases, for each AP (APi, i=1, 2, 3 . . . ), the serving-AP/controller may receive the individual interference level (Int_APi) and/or the individual target power level (Target_APi) and the path loss from the station to the AP (PL_STA_APi). Different mathematical functions may be used to determine a system target power using the individual target power and path loss to the station for each AP. Therefore, the scope and spirit of the example embodiments should not be construed as being limited by the examples presented herein. The STA may be embodied as a generic electronic device (ED) and the AP maybe embodied as a generic base station that are part of a generic communication system.

Using multi-AP coordination can help reduce the interference in communication, and help increase throughput by increasing the number of potential spatial streams that can go through the communication channels. In multi-AP coordination, an uplink signal transmitted from a STA can be received by multiple APs. The uplink signal received at different APs can be utilized to enhance the uplink quality, for example. The uplink signal received at different APs can be combined together to form signal with better SINR before going through the channel decoder. This way both diversity gain and energy gain can be achieved. The uplink signal with the best SINR is selected to go through the channel decoder. This way diversity gain can be achieved. Multiple APs may receive the uplink signal and perform demodulation and decoding to obtain the uplink data packet. If any of the multiple APs successfully decode the uplink data packet, the uplink signal reception is successful. This way diversity gain can be achieved.

To support uplink multi-user transmission (e.g., OFDMA and uplink MU-MIMO), it may be required that the power of the received signal from multiple STAs at the AP receiver is below a threshold to avoid significant interference among the STAs. uplink transmission power control can be utilized to make sure that the power of the received signal from multiple STAs at the AP receiver is at appropriate level.

Existing uplink power control methods, such as those disclosed by U.S. Pat. No. 9,967,827 entitled "System and Method for Power Control" and IEEE P802.11ax/D3.1, August 2018] (both of which are incorporated by reference herein as if reproduced in their entireties), only consider one AP as the uplink receiver. In multi-AP coordination, it is possible that multiple APs become the uplink receivers. Given the diversity gain and/or energy gain that can be potentially achieved in uplink multi-AP coordination, methods need to be developed for uplink power control to reduce STA's power consumption and/or reduce interference to the Overlapping Basic Service Set (OBSS).

U.S. Provisional Application 62,768,229 discloses methods in which a STA receives, from an AP, multiple indications of target uplink receive power, one for each AP participating in the uplink multi-AP coordination, respectively. The STA then derives its uplink transmit power in accordance with the multiple target uplink receive power and the measured multiple path losses between the STA and the Aps.

In an embodiment of the disclosure, a STA receives, from an AP, one indication of target power level (Target_Sys) and derives its uplink transmit power level in accordance with the target power level and the measured path loss between the STA and the AP, while the derived uplink transmit power level can support appropriate uplink multi-AP coordination. The STA may first transmit a first uplink frame to a first AP (e.g., AP1). The first uplink frame may enable AP1 to measure the uplink path loss (PL_STA_AP1) between the STA and AP1. The first uplink frame may also enable a second AP (e.g., AP2) to measure the uplink path loss (PL_STA_AP2) between the STA and AP2. The uplink frame can be in the form of a High Efficiency Null Data Packet PHY Protocol Data Unit (HE NDP PPDU) (which carries no data field), a sounding signal, a data packet, or a control packet. Other options are also possible.

The second AP (e.g., AP2), after measuring the uplink path loss (PL_STA_AP2) between the STA and AP2, and noise and interference level measured at AP2, Int_AP2 transmits an indication of PL_STA_AP2 to AP1. AP2 may transmit this indication of PL_STA_AP2 to AP1 directly, or it can transmit the indication to AP1 through a central controller. AP2 may also transmit an indication of the noise and interference level measured at AP2, Int_AP2, to AP1. AP2 can transmit this indication of Int_AP2 to AP1 directly, or it can transmit the indication to AP1 through a central controller. AP1 may prepare to schedule an uplink transmission for the STA and decides a target receive power level at AP1, Target_AP1. For example, AP1 can decide Target_AP1 in accordance with the bandwidth of the uplink resources allocated for the uplink transmission, the modulation and coding scheme (MCS) configured for the uplink transmission, and the noise and interference level measured at the first AP, Int_AP1. AP1 may then derive a second target receive power level at AP2, Target_AP2, for the transmission. For example, AP1 can decide Target_AP2 as: Target_AP2=Target_AP1+Int_AP2−Int_AP1. AP1 may derive a system target power level Target_Sys, in accordance with Target_AP1, Target_AP2, PL_STA_AP1, and PL_STA_AP2. For example, Target_Sys can be derived as: Target_Sys=min (Target_AP1+PL_STA_AP1, Target_AP2+PL_STA_AP2)−PL_STA_AP1. In this way, the STA may use the Target_Sys to derive the uplink transmit power level for the uplink transmission, such that at least one AP, AP1 or AP2, can satisfy the corresponding target receive power level. This can help the STA reduce its transmit power level compared to the case where the STA is connected to one AP only.

The STA may then receive a first downlink frame (e.g., a trigger frame) from the first AP (e.g., AP1). The first downlink frame may include uplink scheduling information indicating the resource allocation (e.g., frequency resource location) for uplink transmission for the STA. The first downlink frame may also include an indication of the system target power level, e.g., Target_Sys, for the STA. The first downlink frame may also include an indication of AP1's downlink transmit power, PDL_TX_AP1. The indication of downlink transmit power can be in the form of transmit power of the downlink frame, or transmit power of the downlink frame normalized to a bandwidth (e.g., 20 MHz bandwidth). Other forms of indication are also possible. The first downlink frame may further include an indication of AP2's identifier, e.g., AP2's BSSID, a MAC address, etc. The indication of AP2's identifier may help the STA receives from AP2 the acknowledgement to the uplink transmission after the uplink transmission.

The STA measures the downlink received power of the first downlink frame from AP1, PDL_RX_AP1, and derive the path loss (PL_AP1_STA) from AP1 to the STA as the difference between the downlink transmit power of AP1 and the downlink received power of AP1. For example, the PL can be derived as: PL_AP1_STA=PDL_TX_AP1−PDL_RX_AP1. The uplink path loss from STA to AP1 can be related to (or identical to) the downlink path loss from AP1 to STA (e.g., PL_STA_AP1=PL_AP1_STA) when the same frequency band is being used for both uplink and downlink. After obtaining the path loss from AP1, the STA derives the uplink transmit power PUL_TX according to the path loss PL_AP1_STA, and the target uplink receive power Target_Sys, for example, PUL_TX=Target_Sys+PL_AP1_STA. The uplink transmit power can be further limited considering the STA's maximum transmit power level (e.g., PUL_TX_Max), e.g., PUL_TX_Real=min (PUL_TX, PUL_TX_Max). In a short interframe space (SIFS) duration after the end of the first received downlink frame from AP1, the STA may start its uplink transmission with transmit power of PUL_TX_Real on the resource indicated in the uplink scheduling information included in the first downlink frame.

For example, the STA may transmit a HE NDP PPDU, and AP1 and AP2 may measure the path loss PL_STA_AP1 and PL_STA_AP2, respectively, as PL_STA_AP1=83 dB, PL_STA_AP2=77 dB. AP2 may measure the noise and interference level at AP2 as Int_AP2=−90 dBm. AP2 may transmit indications of PL_STA_AP2 and Int_AP2 to AP1. AP1 may measure the noise and interference level at AP1 as Int_AP1=−87 dBm. AP1 may schedule uplink transmission for the STA, and may decide a first target receive power level at AP1 (e.g., Target_AP1=−67 dBm). AP1 may then derive a second target receive power level at AP2 (Target_AP2) for the transmission as: Target_AP2=Target_AP1+Int_AP2−Int_AP1=−67 dBm+(−90 dBm)−(−87 dBm)=−70 dBm. AP1 may then derive a system target power level, Target_Sys, in accordance with Target_AP1, Target_AP2, PL_STA_AP1, and PL_STA_AP2 as: Target_Sys=min (Target_AP1+PL_STA_AP1, Target_AP2+PL_STA_AP2)−PL_STA_AP1=min (−67 dBm+83 dB, −70 dBm+77 dB)−83 dB=min (16 dBm, 7 dBm)−83 dB=−76 dBm.

The STA may receive a trigger frame from AP1. The trigger frame may include uplink scheduling information. The trigger frame may also indicate that the target power level Target_Sys is −76 dBm (e.g., as derived by AP1 previously). The trigger frame may further indicate that AP1's downlink transmit power PDL_TX_AP1 is 23 dBm. The trigger frame may also indicate AP2's identifier (e.g., AP2's BSSID). The STA may measure the received power of the trigger frame from AP1. In one specific example, PDL_RX_AP1=−60 dBm. The STA may derive the path loss (PL) between AP1 and the STA as: PL_AP1_STA=PDL_TX_AP1−PDL_RX_AP1. In one specific example, PL_AP1_STA=23 dBm−(−60 dBm)=83 dB. The STA may then derives the uplink transmit power (PUL_TX) according to the path loss and the Target_Sys, for example, PUL_TX=Target_Sys+PL_AP1_STA. In one specific example, PUL_TX=−76 dBm+83 dB=7 dBm. As a comparison, if there is no uplink multi-AP coordination (e.g., STA is connected to AP1 only), the target uplink receive power would be −67 dBm, and the uplink transmit power would be −67 dBm+83 dB=16 dBm. Assuming the STA's maximum transmission power PUL_TX_Max is 20 dBm, the STA derives the uplink transmission power level PUL_TX_Real as: PUL_TX_Real=min (PUL_TX_Max, PUL_TX)=min (20 dBm, 7 dBm)=7 dBm.

In SIFS, after the end of the trigger frame from AP1, the STA may start its uplink transmission with transmit power of 7 dBm on the resource indicated in the uplink scheduling information included in the trigger frame from AP1. Compared to the case where the STA is connected to AP1 only, the STA's uplink transmit power is reduced from 16 dBm to 7 dBm, which is a 9 dB reduction.

In one embodiment, an AP1 derives the system target power level, Target_Sys, in accordance with Target_AP1, Target_AP2, PL_STA_AP1, and PL_STA_AP2 using the following method: Target_Sys=min (Target_AP1+PL_STA_AP1, Target_AP2+PL_STA_AP2)−PL_STA_AP1=min (PUL_TX_AP1, PUL_TX_AP2)−PL_STA_AP1 where PUL_TX_AP1=Target_AP1+PL_STA_AP1 is the uplink transmit power level such that the received power at AP1 satisfies the target receive power level at AP1, and PUL_TX_AP2=Target_AP2+PL_STA_AP2 is the uplink transmit power such that the received power at AP2 satisfies the target receive level power at AP2. In this embodiment, when the STA uses the Target_Sys to derive the uplink transmit power for the uplink transmission, the uplink transmit power is effectively the lower of PUL_TX_AP1 and PUL_TX_AP2. In this embodiment, other formulas can be used to derive the system target power level Target_Sys in accordance with PUL_TX_AP1 and PUL_TX_AP2. In one example, Target_Sys can be derived as, Target_Sys=(PUL_TX_AP1+PUL_TX_AP2)/2−PL_STA_AP1. In this example, when the STA may use Target_Sys to derive the uplink transmit power for the uplink transmission, the uplink transmit power is effectively the average of PUL_TX_AP1 and PUL_TX_AP2, instead of the lower of PUL_TX_AP1 and PUL_TX_AP2.

Yet in another embodiment, Target_Sys can be derived as Target_Sys=max (PUL_TX_AP1, PUL_TX_AP2)−Correction_Factor−PL_STA_AP1, where max( ) is the maximum function which returns the maximum value of the input elements, and Correction_factor is a numerical value, in dB for example. The Correction_factor may be set to a fixed value (e.g., 3 dB) to compensate for the combination gain of the uplink signals at the APs, when there are two APs participating in the multi-AP coordination. In this example, when the STA uses Target_Sys to derive the uplink transmit power for the uplink transmission, the uplink transmit power is effectively the higher of PUL_TX_AP1 and PUL_TX_AP2 minus the Correction_Factor.

Although two APs are used as an example to illustrate multi-AP coordination it is straight forward to expand the method to cover cases where more than two APs are involved in multi-AP coordination.

Embodiment uplink transmit power control methods can be utilized in multi-AP coordination to reduce STA's power consumption compared to the case where the STA is only connected to one AP. In some examples, embodiments reduce interference to the Overlapping Basic Service Set (OBSS). Embodiments may help to set the uplink transmit power such that the received signal at the APs is at appropriate level, enabling the use of OFDMA and MU-MIMO on the uplink, thereby increasing resource utilization efficiency. Embodiments may reduce downlink overhead (e.g., information carried in the trigger frame) compared to the one proposed in U.S. Provisional Application 62/768,229.

Disclosed herein is a method of communicating in a wireless system. The method comprising: transmitting, by a station, a first uplink frame; receiving, by the station, from a first Access Point (AP), a first downlink frame comprising resource allocation information indicating a location of a resource for transmitting a packet, indication of a target power level (Target_Sys), indication of a first transmit power level, and indication of an identifier of a second AP; determining, by the station, a second transmit power level in accordance with the target power level, and the first transmit power level; transmitting, by the station, the packet at the location of the resource with the second transmit power level. Examples of the method that may be followed are: a) The indication of the target power level is used to reference Target_Sys at the first access AP; b) The first uplink frame enables path loss measurement at the first AP and the second AP; c) Determining the second transmit power level comprises of measuring a first received power level of the first downlink frame and determining a path loss in accordance with the first received power level, and then determining the second transmit power level in accordance with the path loss as PUL_TX=Target_Sys+PL_AP1_STA, where PUL_TX is the second transmit power level, Target_Sys is the target power level, and PL_AP1_STA is the path loss.

Disclosed herein is another method of communicating in a wireless system, the method comprising: receiving, by a first access point (AP), a first uplink frame from a station; determining, by the first AP, a first path loss in accordance with the first uplink frame; receiving, by the first AP, an indication of a second path loss between a second AP and the station; determining, by the first AP, a first target power level in accordance with the first path loss and the second path loss; transmitting, by the first AP, a first downlink frame comprising resource allocation information indicating a location of a resource for transmitting a packet, indication of the first target power level (Target_Sys), indication of a first transmit power level, and indication of an identifier of the second AP; receiving, by the first AP, the packet at the location of the resource, wherein the packet is transmitted at a second transmit power level determined in accordance with the first target power level and the first transmit power level. Examples of the method that may be followed are: a) The indication of the first target power level is referenced at the first access point (AP); b) Determining the first target power level in accordance with the first path loss (PL_STA_AP1) and the second path loss (PL_STA_AP2) comprises: determining, by the first AP, a second target power level (Target_AP1); determining, by the first AP, a third target power level (Target_AP2); and determining, by the first AP, the first target power level in accordance with the first path loss, the second path loss, the second target power level, and the third target power level wherein the first target power level is determined by applying a mathematical function to the first path loss, the second path loss, the second target power level, and the third target power level such as i) Target_Sys=min (Target_AP1+PL_STA_AP1, Target_AP2+PL_STA_AP2)−PL_STA_AP1, and min( ) is a minimum function which returns the minimum value of its input elements; ii) Target_Sys=(Target_AP1+ PL_STA_AP1+Target_AP2+PL_STA_AP2)/2− PL_STA_AP1, and iii) Target_Sys=max (Target_ AP1+PL_STA_AP1, Target_AP2+PL_STA_AP2)−Correction_Factor−PL_STA_AP1, where max( ) is a maximum function which returns the maximum value of its input elements. The example b) further comprising: measuring, by the first AP, a first noise and interference level (Int_AP1) and also receiving from a second AP, by the first AP, a second noise and interference level (Int_AP2) and determining the third target power level as Target_AP2=Target_AP1+Int_AP2−Int_AP1.

In an embodiment, a method of communicating in a wireless system is provided. In this example, the method includes transmitting, by a first access point (AP), a downlink frame to a station (STA). The downlink frame includes resource allocation information indicating a location of a resource for transmitting an uplink frame and an indication of a target power level. The target power level is computed by the first AP in accordance with a first path loss between the first AP and the STA and a second path loss between a second AP and the STA. In one example, the downlink frame further includes an indication of a transmit power of the downlink frame and an identifier of the second AP. In the same example, or in another example, the method further includes computing, by the first AP, the target power level using the first path loss between the first AP and the STA, a first interference level measured by the first AP, the second path loss between the second AP and the STA, and a second interference level measured by the second AP. In any one of the preceding examples, or in another example, the method further includes computing, by the first AP, the first path loss between the first AP and the STA using an uplink received power measurement at the first AP and a transmit power level of an uplink frame previously transmitted by the STA. In any one of the preceding examples, or in another example, the method further includes receiving, by the first AP, a message from the second AP that indicates the second path loss between the second AP and the STA and a second interference level measured by the second AP. In any one of the preceding examples, or in another example, the method further includes receiving, by the first AP, a message from the second AP that indicates the second path loss between the second AP and the STA and a target receive power level to decode the uplink frame at the second AP. In any one of the preceding examples, or in another example, the method further includes computing, by the first AP, the target power level in accordance with the first path loss between the first AP and the STA, a first interference level measured by the first AP, the second path loss between the second AP and the STA and the target receive power level to decode the uplink frame at the second AP. An apparatus for performing this method is also provided.

In another embodiment, another method of communicating in a wireless system is provided. In this example, the method includes receiving, by a station (STA), a downlink frame from a first access point (AP). The downlink frame includes resource allocation information indicating a location of a resource for transmitting an uplink frame, an indication of a target power level, and an identifier of a second AP. The method further includes determining, by the STA, an uplink transmit power level in accordance with at least the target power level, and transmitting, by the STA, the uplink frame over the resource in accordance with the uplink transmit power level. In one example, determining the uplink transmit power level in accordance with at least the target power level comprises determining, by the STA a path loss to the first AP in accordance with a received power level of the downlink frame, and determining, by the STA, the uplink transmit power level in accordance with the target power level and the path loss from the STA to the first AP. In the same example, or in another example, determining the uplink transmit power level in accordance with the path loss and the target power level comprises calculating the uplink transmit power level as a sum of the target power level and the path loss. An apparatus for performing this method is also provided.

Figure 6A:
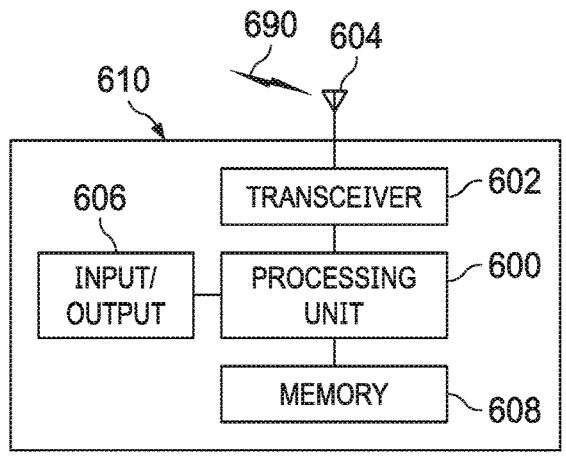
FIGS. 6A-6B are block diagrams of electronic devices adapted to transmit and receive signaling over a telecommunications network.
Figure 6B:
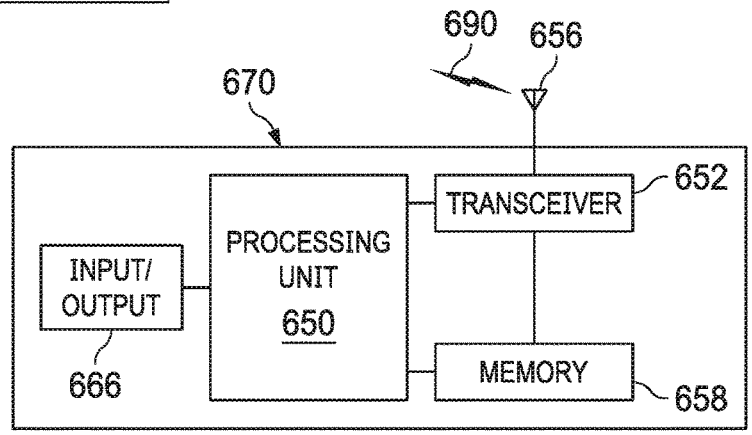

FIGS. 6A and 6B are block diagrams of electronic devices (EDs) adapted to transmit and receive signaling over a telecommunications network. As shown in FIG. 6A, the ED 610 includes at least one processing unit 600. The processing unit 60*o* implements various processing operations of the ED 610. For example, the processing unit 600 could perform signal coding, data processing, power control, input/output processing, or any other functionality enabling the ED 610 to operate in the system 800 in FIG. 8. The processing unit 600 also supports the methods and teachings described in more detail above. Each processing unit 600 includes any suitable processing or computing device configured to perform one or more operations. Each processing unit 600 could, for example, include a microprocessor, microcontroller, digital signal processor, field programmable gate array, or application specific integrated circuit.

The ED 610 also includes at least one transceiver 602. The transceiver 602 is configured to modulate data or other content for transmission by at least one antenna or NIC (Network Interface Controller) 604. The transceiver 602 is also configured to demodulate data or other content received by the at least one antenna 604. Each transceiver 602 includes any suitable structure for generating signals for wireless or wired transmission or processing signals received wirelessly or by wire. Each antenna 604 includes any suitable structure for transmitting or receiving wireless or wired signals. One or multiple transceivers 602 could be used in the ED 610, and one or multiple antennas 604 could be used in the ED 610. Although shown as a single functional unit, a transceiver 602 could also be implemented using at least one transmitter and at least one separate receiver.

The ED 610 further includes one or more input/output devices 606 or interfaces. The input/output devices 606 facilitate interaction with a user or other devices (network communications) in the network. Each input/output device 606 includes any suitable structure for providing information to or receiving information from a user, such as a speaker, microphone, keypad, keyboard, display, or touch screen, including network interface communications.

In addition, the ED 610 includes at least one memory 608. The memory 608 stores instructions and data used, generated, or collected by the ED 610. For example, the memory 608 could store software or firmware instructions executed by the processing unit(s) 600 and data used to reduce or eliminate interference in incoming signals. Each memory 608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 6B, the AP 670 includes at least one processing unit 650, at least one transceiver 652, which includes functionality for a transmitter and a receiver, one or more antennas 656, at least one memory 658, and one or more input/output devices or interfaces 666. A scheduler, which would be understood by one skilled in the art, is coupled to the processing unit 650. The scheduler could be included within or operated separately from the AP 670. The processing unit 650 implements various processing operations of the AP 670, such as signal coding, data processing, power control, input/output processing, or any other functionality. The processing unit 650 can also support the methods and teachings described in more detail above. Each processing unit 650 includes any suitable processing or computing device configured to perform one or more operations. Each processing unit 650 could, for example, include a microprocessor, microcontroller, digital signal processor, field programmable gate array, or application specific integrated circuit.

Each transceiver 652 includes any suitable structure for generating signals for wireless or wired transmission to one or more electronic devices EDs or other devices. Each transceiver 652 further includes any suitable structure for processing signals received wirelessly or by wire from one or more EDs or other devices. Although shown combined as a transceiver 652, a transmitter and a receiver could be separate components. Each antenna 656 includes any suitable structure for transmitting or receiving wireless or wired signals. While a common antenna 656 is shown here as being coupled to the transceiver 652, one or more antennas 656 could be coupled to the transceiver(s) 652, allowing separate antennas 656 to be coupled to the transmitter and the receiver if equipped as separate components. Each memory 658 includes any suitable volatile or non-volatile storage and retrieval device(s). Each input/output device 666 facilitates interaction with a user or other devices (network communications) in the network. Each input/output device 666 includes any suitable structure for providing information to or receiving/providing information from a user, including network interface communications.

Figure 7:
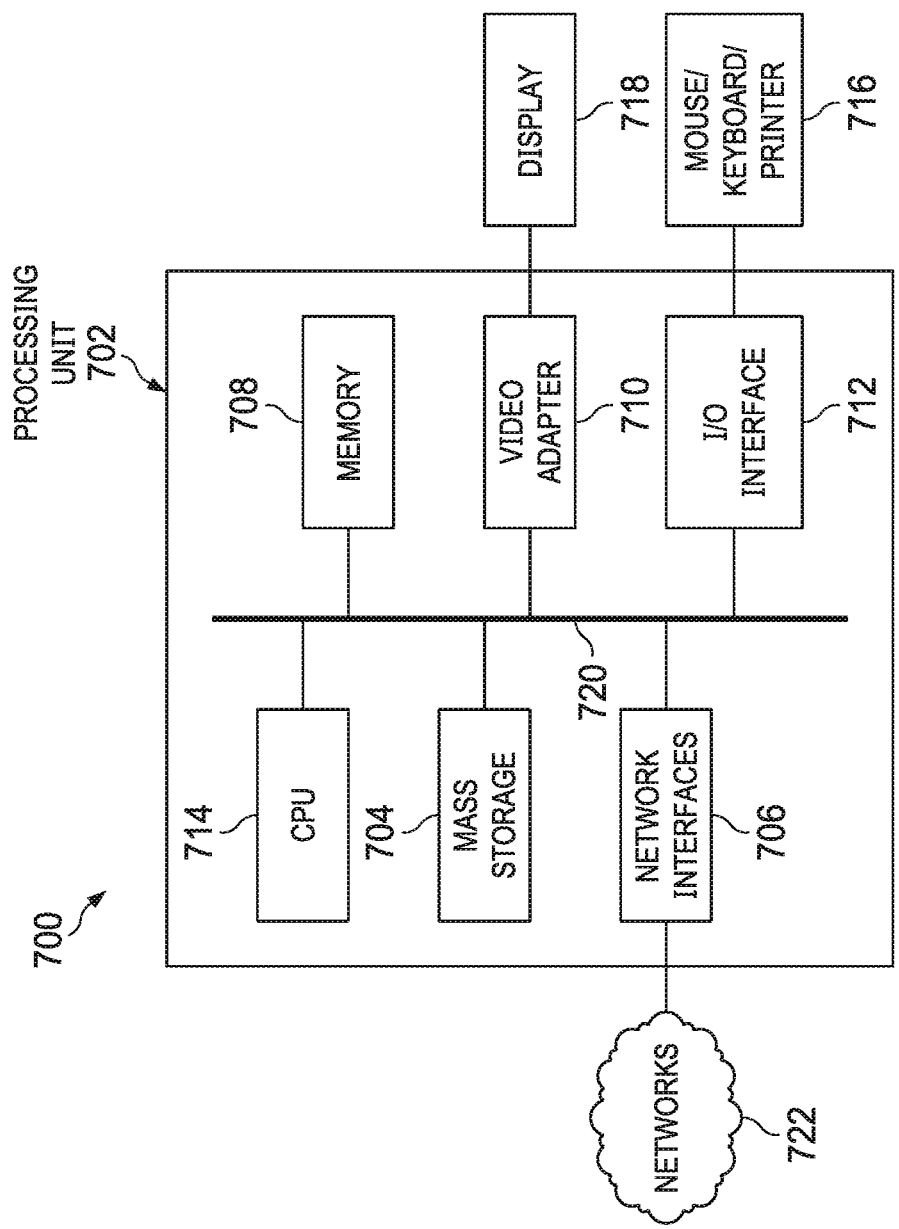
FIG. 7 is a block diagram of a computing system.

FIG. 7 is a block diagram of a computing system 700, which may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse, keyboard, or printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, or a measuring unit or module. The respective units or modules may be hardware, software, or a combination thereof. For instance, one or more of the units or modules may be an integrated circuit, such as field programmable gate arrays (FPGAs) or application-specific integrated circuits (ASICs).

Figure 8:
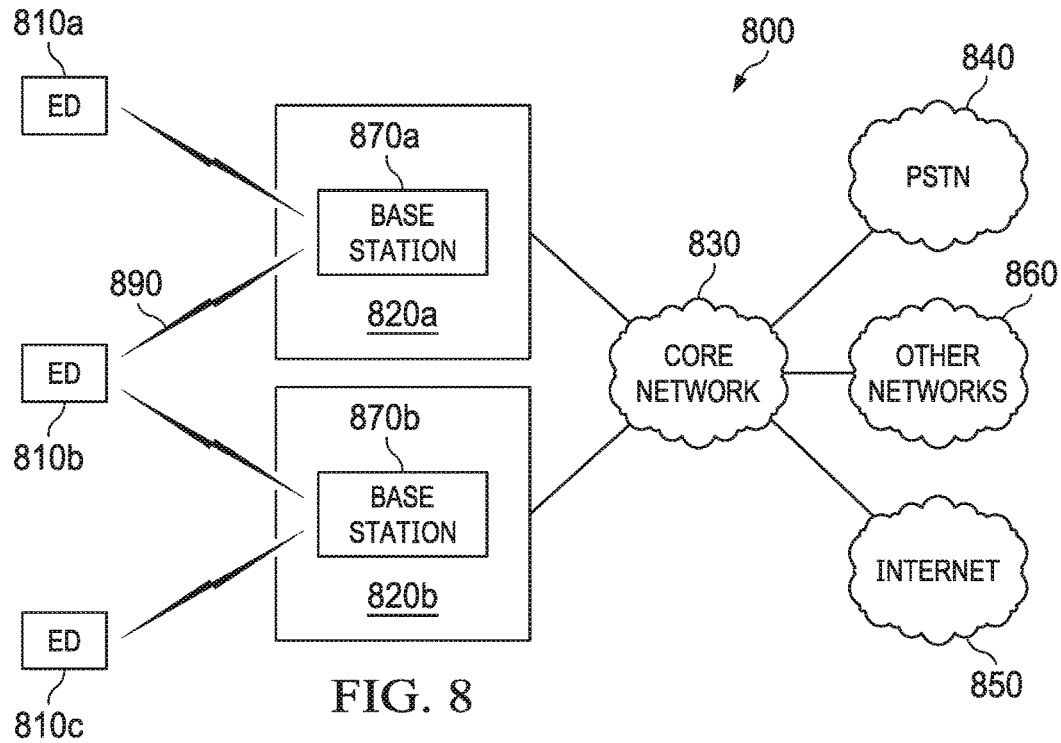
FIG. 8 is a diagram of a communication system.

FIG. 8 is a diagram of a communication system 800 that enables multiple wireless or wired users to transmit and receive data and other content. The system 800 may implement one or more channel access methods, such as code division multiple access (CDMA), time division multiple access (TDMA), frequency division multiple access (FDMA), orthogonal FDMA, single-carrier FDMA (SC-FDMA), or non-orthogonal multiple access (NOMA).

In this example, the communication system 800 includes electronic devices (ED) 810*a*-810*c*, radio access networks (RANs) 820*a*-820*b*, a core network 830, a public switched telephone network (PSTN) 840, the Internet 850, and other networks 860. While certain numbers of these components or elements are shown in FIG. 8, any number of these components or elements may be included in the system 800.

The EDs 810*a*-810*c* are configured to operate or communicate in the system 800. For example, the EDs 810*a*-810*c* are configured to transmit or receive via wireless or wired communication channels. Each ED 810*a*-810*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 820*a*-820*b* here include base stations 870*a*-870*b*, respectively. Each base station 870*a*-870*b* is configured to wirelessly interface with one or more of the EDs 810*a*-810*c* to enable access to the core network 830, the PSTN 840, the Internet 850, or the other networks 860. For example, the base stations 870*a*-870*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an AP (AP), or a wireless router. The EDs 810*a*-810*c* are configured to interface and communicate with the Internet 850 and may access the core network 830, the PSTN 840, or the other networks 860.

In the embodiment shown in FIG. 8, the base station 870*a* forms part of the RAN 820*a*, which may include other base stations, elements, or devices. Also, the base station 870*b* forms part of the RAN 820*b*, which may include other base stations, elements, or devices. Each base station 870*a*-870*b* operates to transmit or receive wireless signals within a particular geographic region or area, sometimes referred to as a "cell." In some embodiments, multiple-input multiple-output (MIMO) technology may be employed having multiple transceivers for each cell.

The base stations 870*a*-870*b* communicate with one or more of the EDs 810*a*-810*c* over one or more air interfaces 890 using wireless communication links. The air interfaces 890 may utilize any suitable radio access technology.

It is contemplated that the system 800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 820*a*-820*b* are in communication with the core network 830 to provide the EDs 810*a*-810*c* with voice, data, application, Voice over Internet Protocol (VoIP), or other services. Understandably, the RANs 820*a*-820*b* or the core network 83*o* may be in direct or indirect communication with one or more other RANs (not shown). The core network 830 may also serve as a gateway access for other networks (such as the PSTN 840, the Internet 850, and the other networks 860). In addition, some or all of the EDs 810*a*-810*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 850.

Although FIG. 8 illustrates one example of a communication system, various changes may be made to FIG. 8. For example, the communication system 800 could include any number of EDs, base stations, networks, or other components in any suitable configuration.

While embodiments of this disclosure have been described with reference to an illustrative embodiment, this description is not intended to be construed in a limiting sense. Various modifications and combinations of the illustrative embodiment, as well as other embodiments, will be apparent to persons skilled in the art upon reference to the description. It is therefore intended that the appended claims encompass any such modifications or embodiments.

What is claimed is:

1. A method, comprising:
computing, by a first access point (AP), a target power level in accordance with a first path loss between the first AP and a station (STA) and a second path loss between a second AP and the STA, both the first AP and the second AP serving the STA; and
transmitting, by the first AP to the STA, a downlink frame, the downlink frame including resource allocation information indicating a location of a resource for transmitting an uplink frame and an indication of the target power level.

2. The method of claim 1, wherein the downlink frame further includes an indication of a transmit power of the downlink frame and an identifier of the second AP.

3. The method of claim 1, the computing the target power level comprising:
computing, by the first AP, the target power level using the first path loss between the first AP and the STA, a first interference level measured by the first AP, the second path loss between the second AP and the STA, and a second interference level measured by the second AP.

4. The method of claim 1, further comprising:
computing, by the first AP, the first path loss between the first AP and the STA using an uplink received power measurement at the first AP and a transmit power level of a previously transmitted uplink frame by the STA.

5. The method of claim 1, further comprising:
receiving, by the first AP, a message from the second AP that indicates the second path loss between the second AP and the STA and a second interference level measured by the second AP.

6. The method of claim 1, further comprising:
receiving, by the first AP, a message from the second AP that indicates the second path loss between the second AP and the STA and a target receive power level of the uplink frame at the second AP.

7. The method of claim 6, the computing the target power level comprising:
computing, by the first AP, the target power level in accordance with the first path loss between the first AP and the STA, a first interference level measured by the first AP, the second path loss between the second AP and the STA, and the target receive power level of the uplink frame at the second AP.

8. The method of claim 1, wherein the STA determines an uplink transmit power level for transmitting the uplink frame to the first AP without any target power level information indicated from the second AP, and the first AP computes the target power level based on a difference between a minimum function (min) (a first target receive power level at the first AP+the first path loss, a second target receive power level at the second AP+the second path loss) and the first path loss.

9. A first access point (AP), comprising:
one or more processors; and
a non-transitory computer readable storage medium storing a program for execution by the one or more processors, the program including instructions that, when executed, cause the AP to:
compute a target power level in accordance with a first path loss between the first AP and a station (STA) and a second path loss between a second AP and the STA, both the first AP and the second AP serving the STA; and
transmit, to the STA, a downlink frame, the downlink frame including resource allocation information indicating a location of a resource for transmitting an uplink frame and an indication of the target power level.

10. The first AP of claim 9, wherein the downlink frame further includes an indication of a transmit power of the downlink frame and an identifier of the second AP.

11. The first AP of claim 9, wherein the instructions that cause the AP to compute the target power level further include instructions that, when executed, cause the AP to:
compute the target power level using the first path loss between the first AP and the STA, a first interference level measured by the first AP, the second path loss between the second AP and the STA, and a second interference level measured by the second AP.

12. The first AP of claim 9, wherein the one or more processors further execute the instructions to cause the AP to:
compute the first path loss between the first AP and the STA using an uplink received power measurement at the first AP and a transmit power level of a previously transmitted uplink frame by the STA.

13. The first AP of claim 9, wherein the one or more processors further execute the instructions to cause the AP to:
receive a message from the second AP that indicates the second path loss between the second AP and the STA and a second interference level measured by the second AP.

14. The first AP of claim 9, wherein the one or more processors further execute the instructions to cause the AP to:
receive a message from the second AP that indicates the second path loss between the second AP and the STA and a target receive power level of the uplink frame at the second AP.

15. The first AP of claim 14, wherein the instructions that cause the AP to compute the target power level further include instructions that, when executed, cause the AP to:
compute the target power level in accordance with the first path loss between the first AP and the STA, a first interference level measured by the first AP, the second path loss between the second AP and the STA and the target receive power level of the uplink frame at the second AP.

16. A method, comprising:
receiving, by a station (STA) from a first access point (AP), a downlink frame, the downlink frame including resource allocation information indicating a location of a resource for transmitting an uplink frame and an indication of a target power level, the target power level based on a first path loss between the STA and the first AP serving the STA and a second path loss between the STA and a second AP serving the STA;
determining, by the STA, an uplink transmit power level in accordance with at least the target power level; and
transmitting, by the STA, the uplink frame over the resource in accordance with the uplink transmit power level.

17. The method of claim 16, wherein the determining the uplink transmit power level in accordance with at least the target power level comprises:
determining, by the STA a path loss to the first AP in accordance with a received power level of the downlink frame; and
determining, by the STA, the uplink transmit power level in accordance with the target power level and the path loss from the STA to the first AP.

18. The method of claim 17, wherein the determining the uplink transmit power level in accordance with the path loss and the target power level comprises calculating the uplink transmit power level as a sum of the target power level and the path loss.

19. The method of claim 16, wherein the downlink frame further includes an identifier of the second AP, the transmitting the uplink frame comprising:
transmitting, by the STA to the first AP and the second AP, the uplink frame over the resource in accordance with the uplink transmit power level.

20. A station (STA) comprising:
one or more processors; and
a non-transitory computer readable storage medium storing a program for execution by the one or more processors, the program including instructions that, when executed, cause the STA to:
receive, from a first access point (AP), a downlink frame, the downlink frame comprising resource allocation information indicating a location of a resource for transmitting a packet and an indication of a target power level, the target power level based on a first path loss between the STA and the first AP serving the STA and a second path loss between the STA and a second AP serving the STA;
determine an uplink transmit power level in accordance with at least the target power level; and
transmit an uplink frame over the resource in accordance with the uplink transmit power level.

21. The STA of claim 20, wherein the one or more processors further execute the instructions to cause the STA to:
determine a path loss in accordance with a received power level of the downlink frame; and
determine the uplink transmit power level in accordance with the target power level and the path loss.

22. The STA of claim 21, wherein the instructions to determine the uplink transmit power level in accordance with the path loss and the target power level includes instructions that, when executed, cause the STA to:
calculate the uplink transmit power level as a sum of the target power level and the path loss.

23. The STA of claim 20, wherein the downlink frame further includes an identifier of the second AP, and wherein the instructions that cause the STA to transmit the uplink frame include instructions that, when executed, cause the STA to:
transmit, to the first AP and the second AP, the uplink frame over the resource in accordance with the uplink transmit power level.

* * * * *